Nov. 24, 1931.   S. W. AVIS   1,833,347
METHOD OF CASTING
Filed Nov. 2, 1929
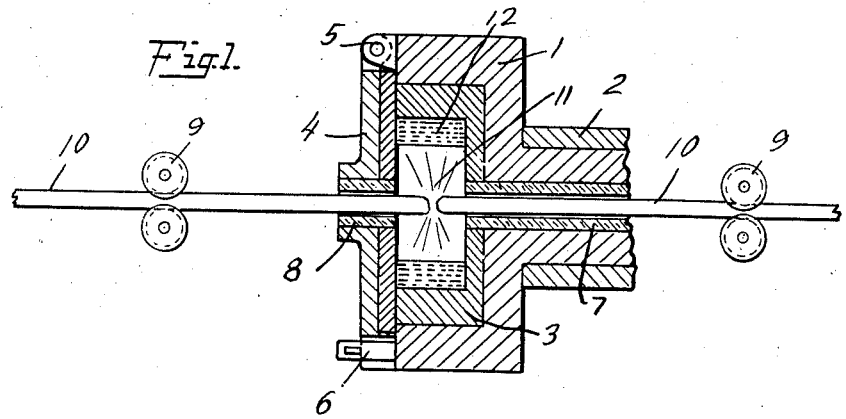
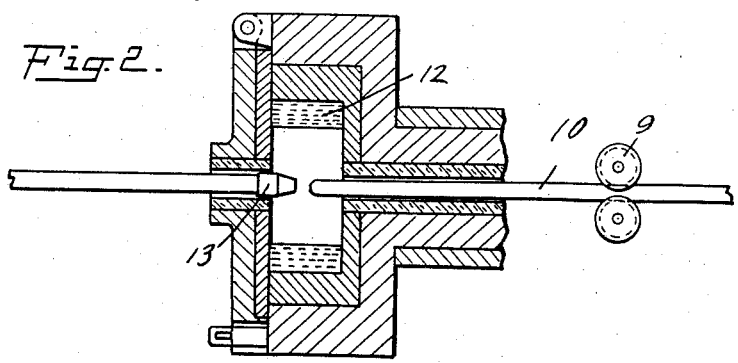
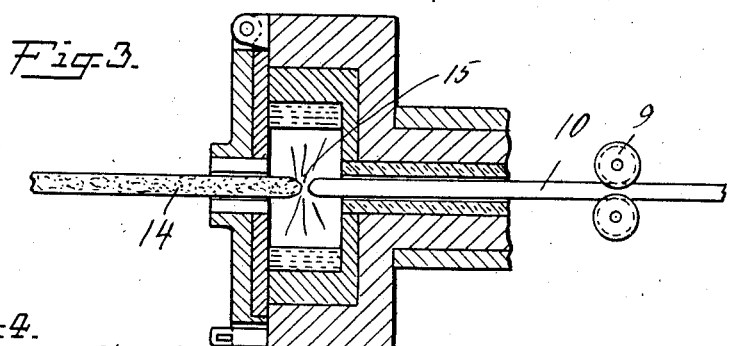
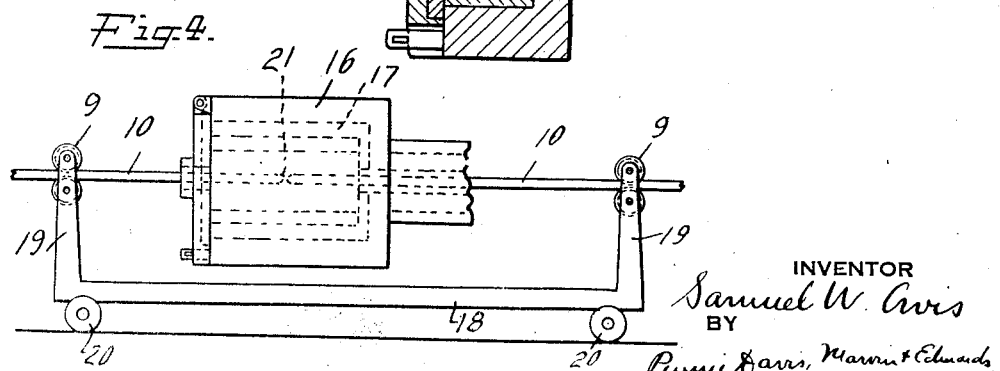
INVENTOR
Samuel W. Avis
BY
Pennie, Davis, Marvin & Edmonds
ATTORNEYS Patented Nov. 24, 1931

1,833,347

UNITED STATES PATENT OFFICE

SAMUEL W. AVIS, OF GREENWICH, CONNECTICUT

METHOD OF CASTING

Application filed November 2, 1929. Serial No. 404,294.

This invention relates to methods of casting and more particularly to a method of casting wherein metal is melted within a mold, and the casting formed by depositing the melted metal on the walls.

While the invention may be practiced in a mold wherein the melted metal is deposited by gravity, I preferably employ a revolving mold, and deposit the metal on the walls of the mold by centrifugal force, and the following description of one embodiment of the invention is directed to that specie.

In practicing the process of my invention the metal from which the casting is to be formed is fed into a rotating mold and melted therein while the mold is rotating. The melted metal is thrown outwardly by centrifugal force and forms the casting on the walls of the mold.

By means of this process many of the disadvantages of prior processes are avoided. The use of furnaces for heating the metal to be cast is eliminated, batch handling of the heated metal is avoided and consequent temperature fluctuations are avoided. More uniform temperature is obtained and other disadvantages incident to external melting and pouring of the molten metal are eliminated. In addition, the metal is deposited gradually on the walls of the mold and this is essential to close grained structure in the art of centrifugal casting.

The metal to be melted is fed into the revolving mold in rod or wire form and is melted in the mold by suitable heating means. Thus, I may employ two electrically charged rods adapted to form an electric arc in the mold and feed the two rods at the proper speed to maintain the arc as the ends of the metal are melted away. Instead of two charged rods a single charged rod and an electrode of suitable material such as carbon may be employed, or I may employ a single uncharged rod and a suitable torch to melt the rod or wire by means of an autogenous flame.

In the accompanying drawings I have illustrated, more or less diagrammatically, several types of apparatus suitable for use in practicing the process and forming a part of the invention. Referring to the drawings:

Fig. 1 is a sectional view wherein two charged rods are employed to form an electric arc;

Fig. 2 is a similar view showing a torch used for melting the metal;

Fig. 3 is a similar view illustrating the use of one charged rod and a carbon electrode; and Fig. 4 is a similar view showing means for advancing the arc axially of the mold to produce products of greater length.

Referring to Fig. 1 of the drawings, the reference numeral 1 designates a revolving mold holder which is mounted in a spindle bearing 2 and is adapted to be rotated by suitable means (not shown). A mold 3 is arranged within the mold holder. The mold is provided with a hinged cover 4 hinged to the holder as at 5 and adapted to be retained in closed position by suitable catch 6. The bottom of the mold and the mold holder are provided with an opening adapted to receive an insulated guide 7 and a similar guide 8 extends through the top of the mold and the cover 4. Feed rolls 9 are arranged adjacent the mold in alignment with the guides 7 and 8 and these feed rolls are adapted to feed charged rods or wires 10 into the mold. The rods or wires may be connected to a suitable source of current (not shown) of sufficient intensity to form an electric arc when the ends of the rods are slightly spaced from each other within the mold as indicated at 11. In operation the rods 10 are progressively fed into the mold, while the mold is rotating, at such speed that the proper distance is maintained between the ends of the rod to form the electric arc, or in other words, the metal is fed to the mold at the same speed at which it is melted. The centrifugal force of the rotating mold throws the metal outwardly against the wall of the mold to form a hollow or cylindrical casting 12.

In the form of the invention shown in Fig. 2 of the drawings the process is practiced in substantially the same manner except that the heat is supplied by an autogenous torch 13 which is substituted for one of the rods and this torch is stationary so as to maintain a position within the mold. The other rod 10 is fed into the mold by the feed rolls 9 at the proper rate to supply the melted metal from which the casting 12 is formed.

In the form of the invention shown in Fig. 3 of the drawings, one charged rod 10 is employed connected to a suitable source of current and progressively fed into the mold by the feed rolls 9. In alignment with the rod 10, and in lieu of the other charged rod 10 or the torch 13, I provide a suitable electrode 14 which is also connected to a source of current so that the electrode and the charged rod maintain an electric arc 15 within the mold to melt the metal. The electrode may be of any suitable material that will not melt too rapidly at the temperatures employed in the process and I preferably employ a carbon electrode for this purpose.

In the forms of the invention heretofore described in which the electric arc or the point of application of the flame of the torch is stationary the length of the casting that can be made by my process is limited and in Fig. 4 of the drawings I have shown a modification of the process wherein lengthier castings may be made. In this form I have shown the two rods 10 similar to Fig. 1, but this is merely for the purpose of illustration, and it will be apparent that this modification of the invention may be applied to either of the forms heretofore described. The mold carrier 16 and mold 17 are substantially similar to the forms heretofore described, but are of greater length. Feed rolls 9 are mounted on a suitable carriage 18 having standards 19 at its opposite ends in which the feed rolls are supported and this carriage is mounted on rollers 20 so that it can be adjusted longitudinally with respect to the mold. It will be apparent that by feeding the rods 10 progressively into the mold as heretofore described and adjusting the carriage 18 longitudinally of the mold, the electric arc 21 can be adjusted longitudinally of the mold so as to produce a longer casting. The arc may be maintained in one position for sufficient time to form a portion of the casting of the desired thickness and then adjusted to a second position to form a second portion of the casting.

The illustration of the various forms of apparatus capable of use in practicing the process is merely diagrammatic and such details as water cooling the mold, coating the interior walls of the mold to prevent welding of the product to the walls, and other refinements well known to those skilled in the art are omitted for the sake of clarity of presentation. Throughout the specification and claims the terms "rod" or "wire" are used in their broadest sense and the invention is in no way limited to a rod or wire of any given size or any given cross section. The novelty of the process is believed to reside in the broad idea of melting the metal within the mold to eliminate external heating, batch treatment and the like and the process is thus not to be limited to material of any particular size or shape.

I claim:

1. The method of casting which comprises feeding a rod of metal into a revolving mold, melting the end of the rod within the mold, and depositing the melted metal on the walls of the mold to form a casting.

2. The method of casting which comprises feeding metal into a revolving mold, melting the metal within the mold, depositing the melted metal on the walls of the mold to form a casting, and adjusting the melting point longitudinally of the mold to deposit the metal over the entire area of the mold wall.

3. The method of casting which comprises feeding a pair of electrically charged rods into opposite ends of a revolving mold, maintaining the ends of the rods spaced from each other to form an electric arc to melt the metal, and depositing the melted metal on the walls of the mold.

4. Apparatus for casting comprising a revolving mold, means for feeding metal longitudinally into said mold, and means for melting the metal within the mold.

5. Apparatus for casting comprising a revolving mold, feeding means adjacent each end of the mold to progressively feed electrically charged metal rods into the mold.

6. Apparatus for casting comprising a revolving mold, means for feeding metal into said mold, means for melting the metal within the mold, and means for adjusting the melting position of the metal longitudinally of the mold.

In testimony whereof I affix my signature.

SAMUEL W. AVIS.